US012280824B2

(12) United States Patent
Zhang et al.

(10) Patent No.: US 12,280,824 B2
(45) Date of Patent: Apr. 22, 2025

(54) EVASIVE STEERING ASSIST MODIFICATION BASED ON MANUAL STEERING INPUTS

(71) Applicant: Aptiv Technologies AG, Schaffhausen (CH)

(72) Inventors: Guoguang Zhang, Westfield, IN (US); Qian Wang, Westfield, IN (US)

(73) Assignee: Aptiv Technologies AG, Schaffhausen (CH)

( * ) Notice: Subject to any disclaimer, the term of this patent is extended or adjusted under 35 U.S.C. 154(b) by 147 days.

(21) Appl. No.: 17/645,716

(22) Filed: Dec. 22, 2021

(65) Prior Publication Data

US 2023/0192191 A1 Jun. 22, 2023

(51) Int. Cl.
*B62D 15/02* (2006.01)
*B62D 5/04* (2006.01)

(52) U.S. Cl.
CPC ....... *B62D 15/0265* (2013.01); *B62D 5/0463* (2013.01)

(58) Field of Classification Search
CPC ..... B60W 30/09; B62D 1/286; B62D 5/0463; B62D 15/0625; G08G 1/165; G08G 1/166
See application file for complete search history.

(56) References Cited

U.S. PATENT DOCUMENTS

| 2008/0097669 | A1* | 4/2008 | Kasbarian | B62D 6/10 701/42 |
| 2008/0208408 | A1* | 8/2008 | Arbitmann | B60W 10/20 701/41 |
| 2011/0098890 | A1* | 4/2011 | Lee | B62D 1/286 701/42 |
| 2013/0124041 | A1 | 5/2013 | Belser et al. | |
| 2014/0032049 | A1* | 1/2014 | Moshchuk | G08G 1/166 701/42 |
| 2014/0360803 | A1* | 12/2014 | Hori | G01L 5/221 180/446 |

(Continued)

FOREIGN PATENT DOCUMENTS

| CN | 111409695 A | * | 7/2020 | ......... B62D 15/0265 |
| WO | WO-2021029331 A1 | * | 2/2021 | ........... B62D 5/0481 |

OTHER PUBLICATIONS

"Extended European Search Report", EP Application No. 22197961.0, May 23, 2023, 11 pages.

(Continued)

*Primary Examiner* — Navid Z. Mehdizadeh
*Assistant Examiner* — Caitlin R McCleary
(74) *Attorney, Agent, or Firm* — Harness, Dickey & Pierce, P.L.C.

(57) ABSTRACT

The techniques and systems herein enable ESA modification based on manual steering inputs. Specifically, a score is determined for a manual steering input to a host vehicle while an ESA is actively applying an ESA steering input to the host vehicle. The score quantifies an amount of additional steering input relative to the ESA steering input (e.g. additional steering angle, steering wheel torque). The ESA steering input is maintained, modified, or canceled based on the score. By doing so, the system is able to effectively adapt the ESA to the manual steering inputs thereby allowing for effective collision mitigation while ensuring that the vehicles operate as intended by the drivers.

12 Claims, 5 Drawing Sheets

(56) References Cited

U.S. PATENT DOCUMENTS

| | | | | |
|---|---|---|---|---|
| 2017/0088166 A1* | 3/2017 | Kunihiro | ................ | B62D 6/002 |
| 2018/0273087 A1* | 9/2018 | Schiebahn | ............... | B62D 5/06 |
| 2019/0367092 A1* | 12/2019 | Heo | .................... | B62D 15/025 |
| 2020/0241548 A1* | 7/2020 | Kuno | .................... | G05D 1/024 |
| 2021/0291818 A1* | 9/2021 | Barth | .................... | G08G 1/166 |
| 2021/0371010 A1* | 12/2021 | Kojo | ................... | B62D 15/025 |

OTHER PUBLICATIONS

European Office Action regarding Patent Application No. 22197961.0, dated Dec. 21, 2023.

* cited by examiner

EVASIVE STEERING ASSIST MODIFICATION BASED ON MANUAL STEERING INPUTS

BACKGROUND

Driver-assistance technologies are increasingly adopted in vehicles to increase safety. Evasive steering assist (ESA) is one driver-assistance technology that enables vehicles to automatically turn to avoid collisions with objects. For example, if a collision with an object is imminent, the ESA is activated to provide a steering input to the vehicle to avoid the object. Often when ESA systems are activated, drivers of the vehicles provide additional (manual) steering inputs to the vehicles (e.g., through a steering wheel). Adapting ESA based on these additional steering inputs is important in ensuring that safety is maintained, while still enabling appropriate amounts of driver control.

SUMMARY

This document is directed to systems, apparatuses, techniques, and methods for enabling ESA modification based on manual steering inputs. The systems and apparatuses may include components or means (e.g., processing systems) for performing the techniques and methods described herein. Some aspects described below include a system including at least one processor configured to determine that an ESA of a host vehicle is providing an ESA steering input to the host vehicle to avoid a collision with a target. The processor is also configured to determine a manual steering input to the host vehicle provided by a driver of the host vehicle and a score for the manual steering input. The score quantifies an amount of additional steering input provided by the manual steering input relative to the ESA steering input. The processor is further configured to determine whether the score meets a first threshold for adjusting the ESA steering input. Responsive to determining that the score does not meet the first threshold, the processor is configured to refrain from modifying the ESA steering input. Alternatively, responsive to determining that the score does meet the first threshold, the processor is configured to determine whether the score meets a second threshold for canceling the ESA steering input. Responsive to determining that the score does not meet the second threshold, the processor is configured to modify the ESA steering input to provide a different ESA steering input than the ESA steering input prior to the modification. Alternatively, responsive to determining that the score does meet the second threshold, the processor is configured to cancel the ESA steering input.

The techniques and methods may be performed by the above system, another system or component, or a combination thereof. Some aspects described below include a method that includes determining that an ESA of a host vehicle is providing an ESA steering input to the host vehicle to avoid a collision with a target. The method also includes determining a manual steering input to the host vehicle provided by a driver of the host vehicle and determining a score for the manual steering input. The score quantifies an amount of additional steering input provided by the manual steering input relative to the ESA steering input. The method further includes determining whether the score meets a first threshold for adjusting the ESA steering input and whether the score meets a second threshold for canceling the ESA steering input. The method also includes modifying, based on whether the score meets the second threshold, the ESA steering input to provide a different ESA steering input than the ESA steering input prior to the modifying.

The components may include computer-readable storage media including instructions that, when executed by the above system, another system or component, or a combination thereof, implement the method above and other methods. Some aspects described below include computer-readable storage media including instructions that, when executed by a processor, cause the processor to determine that an ESA of a host vehicle is providing an ESA steering input to the host vehicle to avoid a collision with a target. The instructions also cause the processor to determine a manual steering input to the host vehicle provided by a driver of the host vehicle and a score for the manual steering input. The score quantifies an amount of additional steering input provided by the manual steering input relative to the ESA steering input. The instructions further cause the processor to determine whether the score meets a first threshold for adjusting the ESA steering input. Responsive to determining that the score does not meet the first threshold, the instructions cause the processor to refrain from modifying the ESA steering input. Alternatively, responsive to determining that the score does meet the first threshold, the instructions cause the processor to determine whether the score meets a second threshold for canceling the ESA steering input. Responsive to determining that the score does not meet the second threshold, the instructions cause the processor to modify the ESA steering input to provide a different ESA steering input than the ESA steering input prior to the modification. Alternatively, responsive to determining that the score does meet the second threshold, the instructions cause the processor to cancel the ESA steering input.

This Summary introduces simplified concepts for enabling ESA modification based on manual steering inputs that are further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

Systems and techniques for enabling ESA modification based on manual steering inputs are described with reference to the following drawings that use some of the same numbers throughout to reference like or examples of like features and components.

DETAILED DESCRIPTION

Overview

ESA systems are able to apply steering inputs to vehicles in order to mitigate potential collisions with objects. During such interventions, drivers of the vehicles are able to provide additional steering inputs to the vehicles (e.g., through a steering wheel). Doing so, however, can cause conventional ESA systems to operate irregularly. For example, many conventional ESA systems cancel ESA when a steering torque provided by a driver surpasses a threshold. In many cases, merely canceling the ESA may be dangerous because the driver may inadvertently be reacting to the ESA intervention.

The techniques and systems herein enable ESA modification based on manual steering inputs. Specifically, a score is determined for a manual steering input to a host vehicle while an ESA is actively applying an ESA steering input to the host vehicle. The score quantifies an amount of additional steering input relative to the ESA steering input (e.g. additional steering angle, steering wheel torque). The ESA steering input is maintained, modified, or canceled based on the score. By doing so, the system is able to effectively adapt the ESA to the manual steering inputs thereby allowing for effective collision mitigation while ensuring that the vehicles operate as intended by the drivers.

Example Environment

Figure 1:
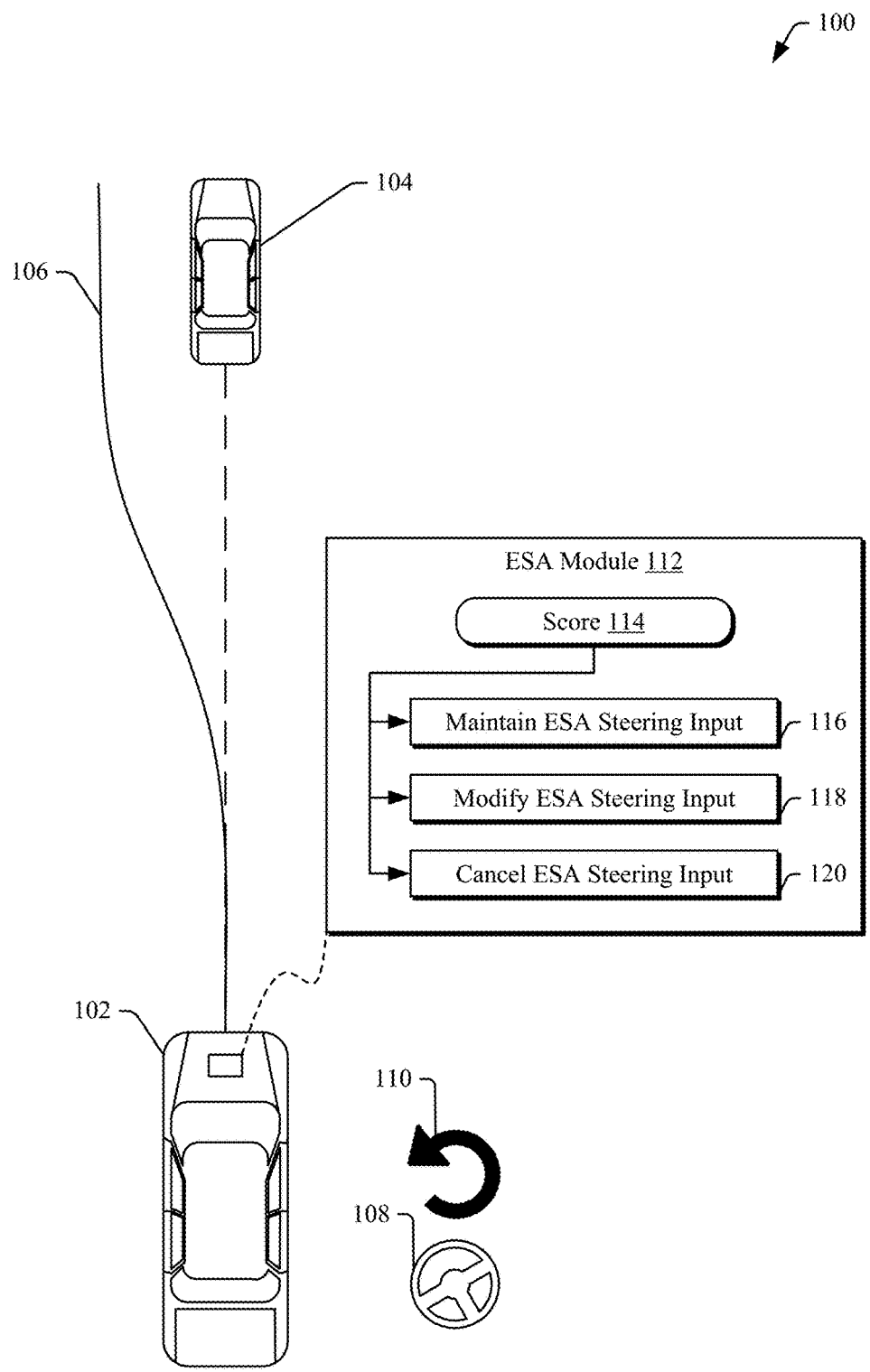
FIG. 1 illustrates, in accordance with techniques of this disclosure, an example environment where ESA modification based on manual steering inputs may be used.

FIG. 1 illustrates an example environment 100 where ESA modification based on manual steering inputs may be used. The example environment 100 contains a host vehicle 102 and a target 104. The host vehicle 102 may be any type of system (automobile, car, truck, motorcycle, e-bike, boat, air vehicle, and so on). The target 104 may be any type of moving or stationary object (automobile, car, truck, motorcycle, e-bike, boat, pedestrian, cyclist, boulder, and so on).

In the example environment 100, the host vehicle 102 determines that a collision with the target 104 is imminent and activates ESA. The ESA generates a path 106 to avoid the target 104 and provides an ESA steering input to the host vehicle 102 to follow the path 106.

In addition to the ESA steering input, a manual steering input is provided by a driver of the host vehicle 102. For example, the driver may wish to modify the path 106 or to manually control the host vehicle 102. In some situations, there may be another object or target (e.g., to the left of the path), that may cause the driver to want to more-closely avoid the target 104 (e.g., by pushing the path 106 to the right). In other situations, the driver may wish to further avoid the target 104 (e.g., by pushing the path further to the left).

The total steering input (e.g., that provided by ESA and the driver) is illustrated by a steering angle 108 and by a manual steering torque 110. The steering angle 108 may be an angle of steering wheels relative to a zero point (e.g., straight). The steering angle 108 is a combination of a steering angle provided by the ESA and that provided by the driver. Thus, a manual steering angle (e.g., that provided in addition to the ESA) may be a difference between the steering angle 108 and an expected steering angle to follow the path 106. The manual steering torque 110 is indicative of an amount of torque provided to a steering column of the host vehicle 102.

An ESA module 112 of the host vehicle, which is implemented at least partially in hardware, calculates a score 114 for the manual steering input (e.g., the additional steering input provided by the driver relative to the ESA steering input). The score is based on the steering angle 108, an expected steering angle (e.g., that to follow the path 106) from the ESA, and the manual steering torque 110. The calculation of the score 114 is described further below.

The ESA module 112 uses the score 114 to determine whether to maintain the ESA steering input (e.g., at 116), modify the ESA steering input (e.g., at 118), or cancel the ESA steering input (e.g., at 120). Maintaining the ESA steering input may involve the ESA continuing to steer the host vehicle 102 along the path 106. Canceling the ESA steering input may involve the ESA ceasing the ESA steering input to allow the driver to manually steer the host vehicle 102. Modifying the ESA steering input may involve the ESA module 112 modifying the path 106. The modification of the ESA steering input is discussed further below.

By using the score 114 to maintain, modify, or cancel the ESA steering input, the techniques described herein enable the ESA module 112 to tune ESA steering input in light of additional manual steering inputs. In doing so, the collision with the target 104 may still be mitigated while providing further control by the driver of the host vehicle 102 as to how the host vehicle 102 avoids the target 104. Furthermore, the use of the steering angle 108 in calculating the score 114 enables the ESA module 112 to determine intentions of the driver more-accurately, which may lead to increased safety and driver satisfaction.

Figure 2:
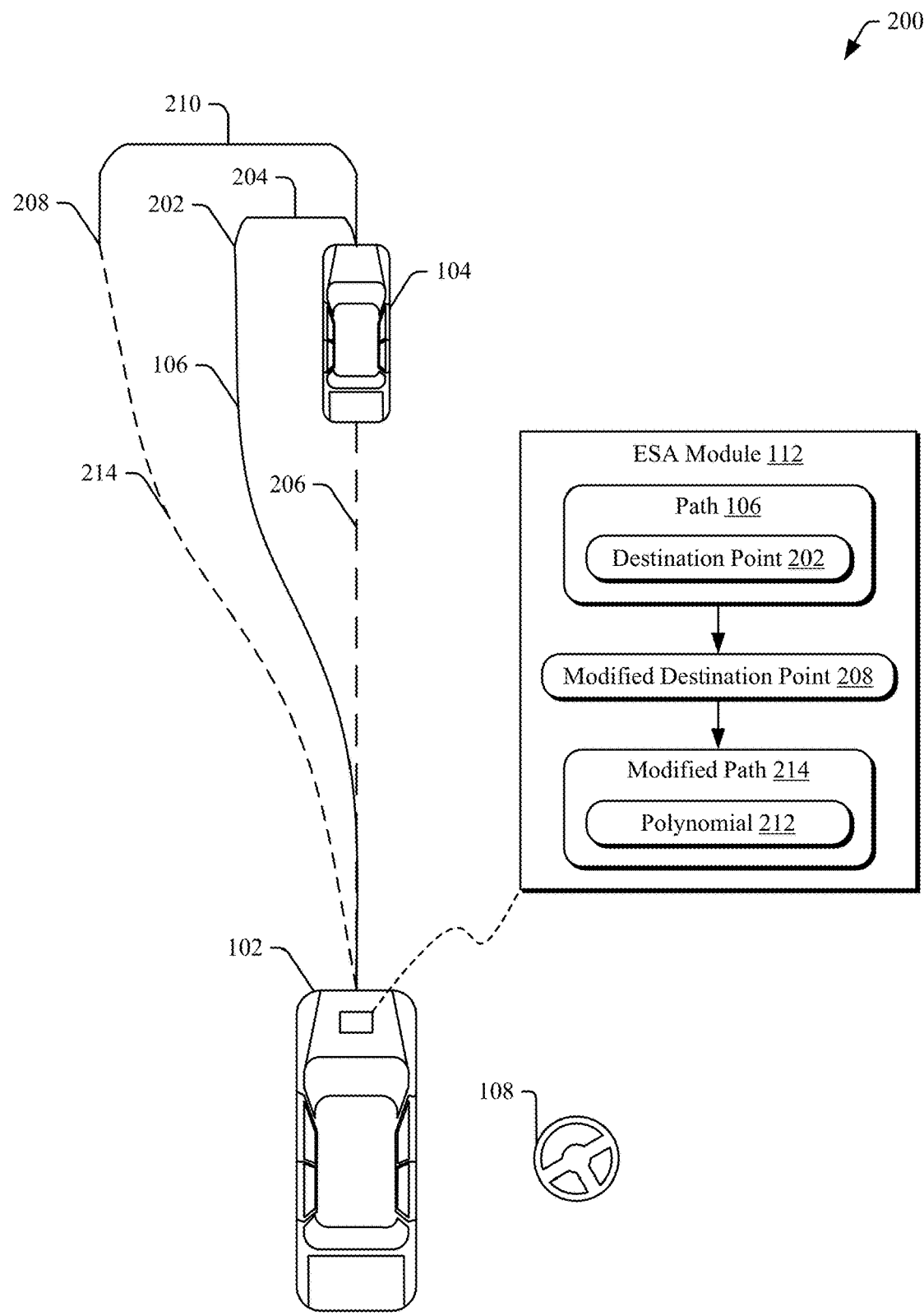
FIG. 2 illustrates, in accordance with techniques of this disclosure, an example ESA modification.

FIG. 2 is an example illustration 200 of an ESA modification (e.g., at 118). As described above, modifying the ESA may involve adjusting the path 106 based on the manual steering input. As illustrated, the path 106 has a corresponding destination point 202. The destination point 202 represents a point on the path 106 that is laterally adjacent to the target 104 and at a longitudinal distance proximate to the target 104. In many cases, the path 106 may end once the host vehicle 102 is laterally clear of the target 104. Thus, the end of the path 106 may be the destination point 202. Regardless of where the destination point 202 is longitudinally relative to the host vehicle 102, the destination point 202 has a certain lateral distance 204. The lateral distance 204 may be calculated any datum relative to the host vehicle 102 or target 104 (e.g., centerline 206).

The ESA module 112 uses the steering angle 108 and the path 106 to determine the manual steering angle (or use the manual steering angle calculated as part of the score 114). Again, the manual steering angle is that provided by the driver in addition to that expected via the ESA. The manual steering angle is used to generate a modified destination point 208 with a modified lateral distance 210 from the datum (e.g., the centerline 206). For example, the modified lateral distance 210 may be calculated based on Equation 1.

$$y + c^* \text{Angle}_{Add} \qquad (1)$$

where y is the lateral distance 204, c is a constant, and $\text{Angle}_{Add}$ is the additional steering angle provided by the driver (e.g., the steering angle 108 minus the steering angle expected via the ESA and/or the path 106).

Based on the modified destination point 208 relative to a current location of the host vehicle 102, the ESA module 112 generates a polynomial 212 of a curve from the current location to the modified destination point 208. The polynomial 212 may be any order (e.g., $4^{th}$ or $5^{th}$ order polynomial). The ESA module 112 may then use the polynomial 212 to create a modified path 214 for the ESA module 112 or an associated ESA system to follow.

By generating the modified path 214 based on the additional steering angle, the ESA module enables the host vehicle 102 to better adapt to driver inputs during ESA events. For example, a driver of the host vehicle 102 may intend to modify the ESA without canceling it. As many conventional systems would simply cancel the ESA due to the driver input, the techniques described herein enable increased safety and driver satisfaction.

Example System

Figure 3:
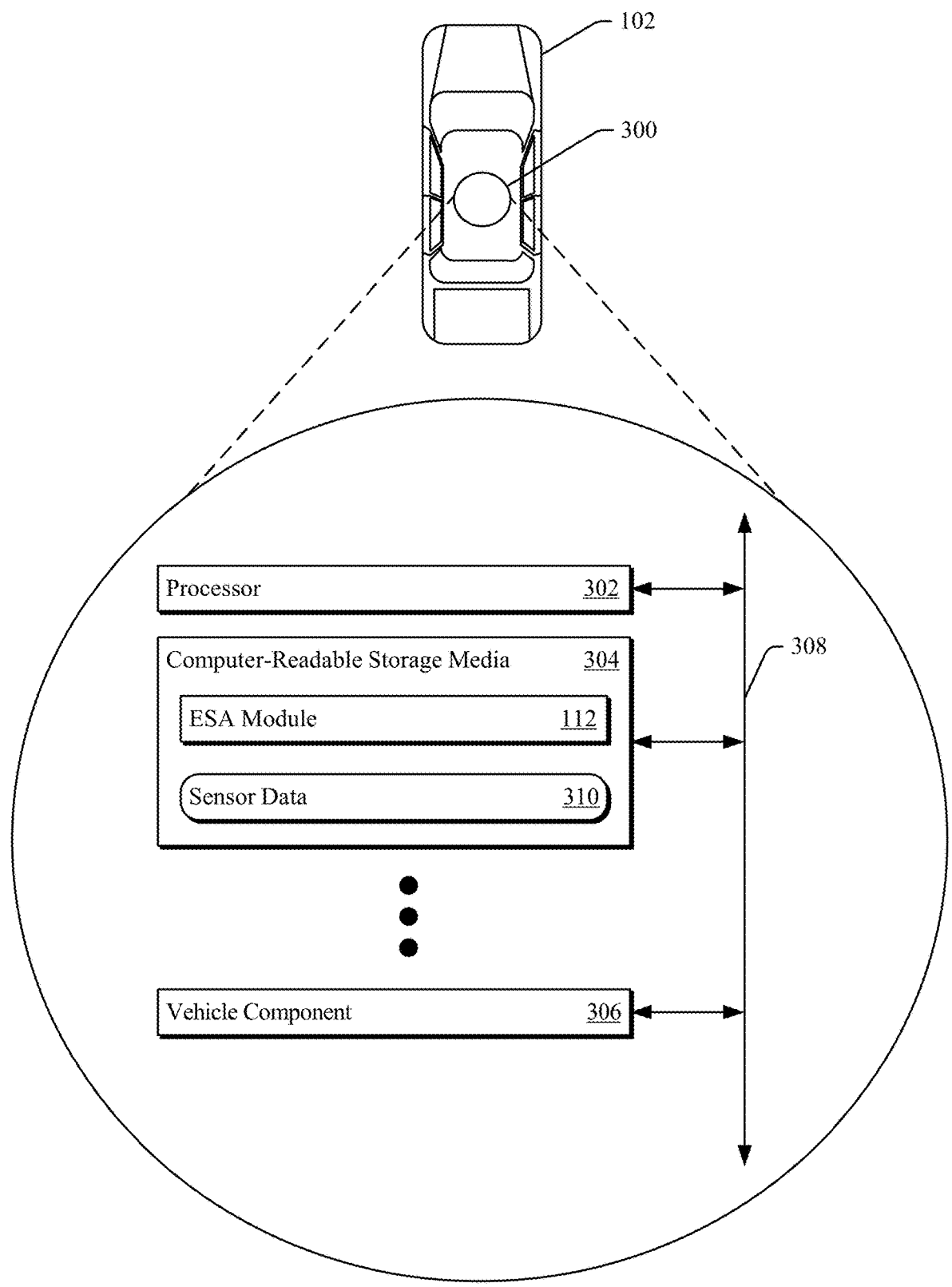
FIG. 3 illustrates, in accordance with techniques of this disclosure, an example system of a host vehicle configured to implement ESA modification based on manual steering inputs.

FIG. 3 illustrates an example system 300 configured to be disposed in the host vehicle 102 and configured to implement ESA modification based on manual steering inputs. Components of the example system 300 may be arranged anywhere within or on the host vehicle 102. The example system 300 may include at least one processor 302, computer-readable storage media 304 (e.g., media, medium, mediums), and a vehicle component 306. The components are operatively and/or communicatively coupled via a link 308.

The processor 302 (e.g., application processor, microprocessor, digital-signal processor (DSP), controller) is coupled to the computer-readable storage media 304 via the link 308 and executes instructions (e.g., code) stored within the computer-readable storage media 304 (e.g., non-transitory storage device such as a hard drive, solid-state drive (SSD), flash memory, read-only memory (ROM)) to implement or otherwise cause the ESA module (or a portion thereof) to perform the techniques described herein. Although shown as being within the computer-readable storage media 304, the ESA module 112 may be a stand-alone component (e.g., having dedicated computer-readable storage media comprising instructions and/or executed on dedicated hardware, such as a dedicated processor, pre-programmed field-programmable-gate-array (FPGA), system on chip (SOC), and the like). The processor 302 and the computer-readable storage media 304 may be any number of components, comprise multiple components distributed throughout the host vehicle 102, located remote to the host vehicle 102, dedicated or shared with other components, modules, or systems of the host vehicle 102, and/or configured differently than illustrated without departing from the scope of this disclosure.

The computer-readable storage media 304 also contains sensor data 310 generated by one or more sensors (not shown) that may be local or remote to the example system 300. The sensor data 310 indicates or otherwise enables the determination of information usable to perform the techniques described herein. For example, sensors may generate sensor data 310 indicative of the steering angle 108 (e.g., in a steering rack, steering column, at the wheels) and the manual steering torque (e.g., in the steering column). The sensor data 310 may be used to determine other attributes, as discussed below.

In some implementations, the sensor data 310 may come from a remote source (e.g., via link 308). The example system 300 may contain a communication system (not shown) that receives sensor data 310 from the target 104 or another remote source.

The vehicle component 306 contains one or more systems or components that are communicatively coupled to the ESA module 112 and configured to apply the outputs of the ESA module 112 to control the host vehicle 102 (e.g., to adjust the ESA steering input, follow the path 106, follow the modified path 214). For example, the vehicle component 306 may comprise an ESA system with means for steering the host vehicle 102 (e.g., hydraulics, servos, actuators). The vehicle component 306 is communicatively coupled to the ESA module 112 via the link 308. Although shown as separate components, the ESA module 112 may be part of the vehicle component 306 and visa-versa.

By using the example system 300, the host vehicle 102 may adapt to manual steering inputs provided by a driver. For example, the example system 300 can maintain, modify, or cancel an ESA intervention based on the manual steering inputs. Doing so enables the driver to have more control of the host vehicle 102 during ESA events while still ensuring that the ESA works as intended (e.g., causes the host vehicle 102 to avoid the target 104), thereby maintaining or improving safety of the host vehicle 102.

Example Data Flow

Figure 4:
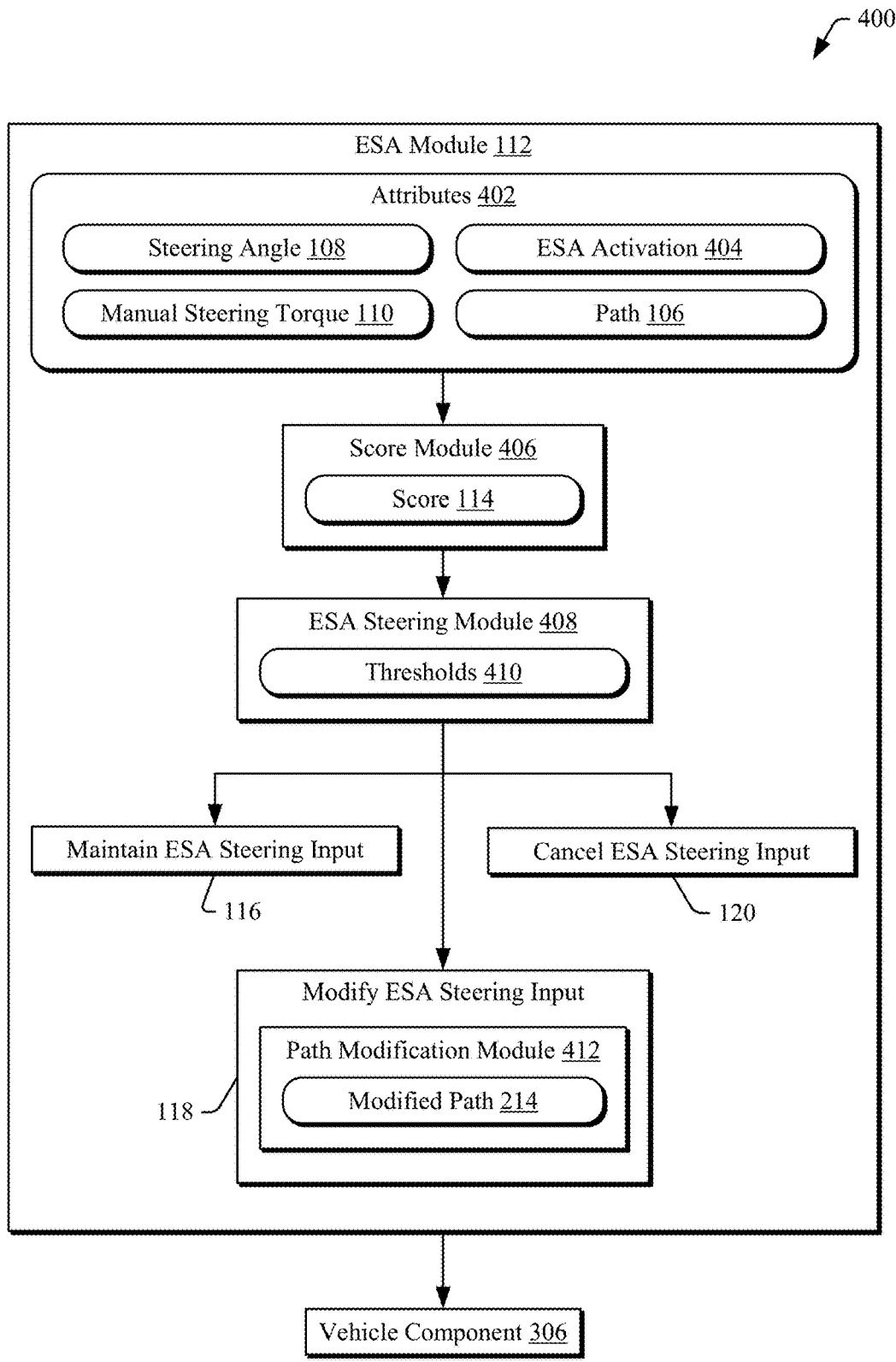
FIG. 4 illustrates, in accordance with techniques of this disclosure, an example data flow for ESA modification based on manual steering inputs.

FIG. 4 is an example data flow 400 of ESA modification based on manual steering inputs. The example data flow 400 may be implemented in any of the previously described environments and by any of the previously described systems or components. For example, the example data flow 400 can be implemented in the example environment 100, according to the example illustration 200, and/or by the example system 300. The example data flow 400 may also be implemented in other environments, by other systems or components, and utilizing other data flows or techniques. Example data flow 400 may be implemented by one or more entities (e.g., the ESA module 112). The order in which the operations are shown and/or described is not intended to be construed as a limitation, and the order may be rearranged without departing from the scope of this disclosure. Furthermore, any number of the operations can be combined with any other number of the operations to implement the example data flow or an alternate data flow.

The example data flow 400 starts with attributes 402 of an environment (e.g., example environment 100) being obtained by the ESA module 112. As shown, the attributes 402 include the steering angle 108, the manual steering torque 110, the path 106, and an ESA activation 404. The ESA activation 404 is an indication that ESA is active, e.g., ESA is providing an ESA steering input into the host vehicle 102. As discussed above, when activated, the ESA creates the path 106. Thus, the existence of the path 106 may act as the ESA activation 404. In other scenarios, a separate indication (e.g., the ESA activation 404) may be used. The path 106 may be received from another module or component that generated the path 106 (e.g., an ESA activation module), or the path 106 may be generated by the ESA module 112 (e.g., the ESA module 112 is also configured to activate the ESA).

The attributes 402 may be acquired, received, or determined by the ESA module 112. For example, the ESA module 112 may determine the attributes 402 directly from the sensor data 310, from a bus or interface connected to sensors that interface with the example system 300, or from another module or system of the example system 300. Regardless of how or where the attributes 402 are gathered, received, derived, or calculated, the ESA module 112 is configured to use the attributes 402 to maintain the ESA steering input (e.g., at 116), modify the ESA steering input (e.g., at 118), or cancel the ESA steering input (e.g., at 120).

To do so, the attributes 402 are input into a score module 406. The score module 406 is configured to generate the score 114 that is indicative of the manual steering input provided by the driver. The score 114 may be calculated using Equation 2.

$$\alpha * \sigma\left(\beta_1 * \text{abs}\left(Angle_0^{actual} - Angle_0^{command_{adj}}\right)\right) + \qquad (2)$$

$$(1-\alpha) * \sigma\left(\beta_2 * \text{abs}\left(\frac{1}{n}\sum_{i=0}^{n-1} Torque_i\right)\right)$$

where α is a weighting constant for weighting the additional steering angle and the manual steering torque 110, σ(x) is Sigmoid function, e.g., $$\sigma(x) = \frac{1}{1+e^{-x}}$$

that saturates x and returns a value in the range 0 to 1, $\beta_1$ and $\beta_2$ are tuning constants, $Angle_0^{actual} - Angle_0^{command_{adj}}$ is the $Angle_{add}$ where $Angle_0^{actual}$ is the steering angle 108 and $Angle_0^{command_{adj}}$ is the expected steering angle from the ESA (e.g., to follow the path 106), n is a number of data points for a moving average of the manual steering torque 110 (e.g., for the latest 0.1 second), and $Torque_i$ is the manual steering torque.

Thus, the score 114 may be based on the additional steering angle provided by the driver (relative to the ESA steering input) and a moving average of the manual steering torque 110. In some implementations, an instantaneous manual steering torque 110 may be used to calculate the score (instead of a moving average). The score 114, according to Equation 2 may be between 0 and 1. When a different saturation function is used, the score 114 may be between different values (e.g., −1 to 1). Different equations may be used to calculate the score (e.g., based on the additional steering angle and manual steering torque 110) without departing from the scope of this disclosure. By using both the additional steering angle and the manual steering torque 110, the ESA module may more accurately determine an intention of the driver (e.g., to maintain, modify, or cancel the ESA) and react accordingly. Furthermore, when the moving average is used, transient spikes in the manual steering torque 110 may be compensated for (e.g., due to the driver being startled by the ESA activation).

The score 114 is input into an ESA steering module 408 that compares the score 114 to a plurality of thresholds 410. The thresholds 410 may comprise a first threshold indicative of modifying the ESA and a second threshold, that is higher than the first threshold, indicative of canceling the ESA. Responsive to the score 114 not meeting the first threshold, the ESA steering module 408 may determine to maintain the ESA (e.g., at 116). Doing so may involve causing the vehicle component 306 to maintain the ESA steering input (e.g., that to follow the path 106). Responsive to the score 114 meeting the second threshold, the ESA steering module 408 may determine to cancel the ESA (e.g., at 120). Doing so may involve causing the vehicle component 306 to stop providing the ESA steering input.

Responsive to the score 114 meeting the first threshold but not the second threshold, the ESA steering module 408 may determine to modify the ESA (e.g., at 118), as described above. For example, a path modification module 412 may generate the modified path 214 based on the modified destination point 208 determined from the additional steering angle provided by the driver (e.g., the $Angle_{Add}$) and the destination point 202. The modified path 214 may be sent to the vehicle component 306 or otherwise used to control the vehicle component 306 such that the vehicle component 306 can cause the host vehicle 102 to follow the modified path 214.

Although shown as being within the ESA module 112, the score module 406, the ESA steering module 408, and/or the path modification module 412 may be separate from the ESA module 112. For example, the score module 406, the ESA steering module 408, and/or the path modification module 412 may be a stand-alone component and/or executed via dedicated hardware.

By using the above techniques, ESA may be adapted for additional steering inputs provided by a driver of the host vehicle 102. More specifically, the ESA may be maintained, modified, or canceled based on the additional steering angle and manual steering torque 110 provided by the driver. In this way, the ESA can still be maintained while allowing the driver more control over how the ESA mitigates the potential collision with the target 104. This allows for increased safety and experience of passengers of the host vehicle 102, the target 104, and/or other people proximate to the host vehicle 102.

Example Method

Figure 5:
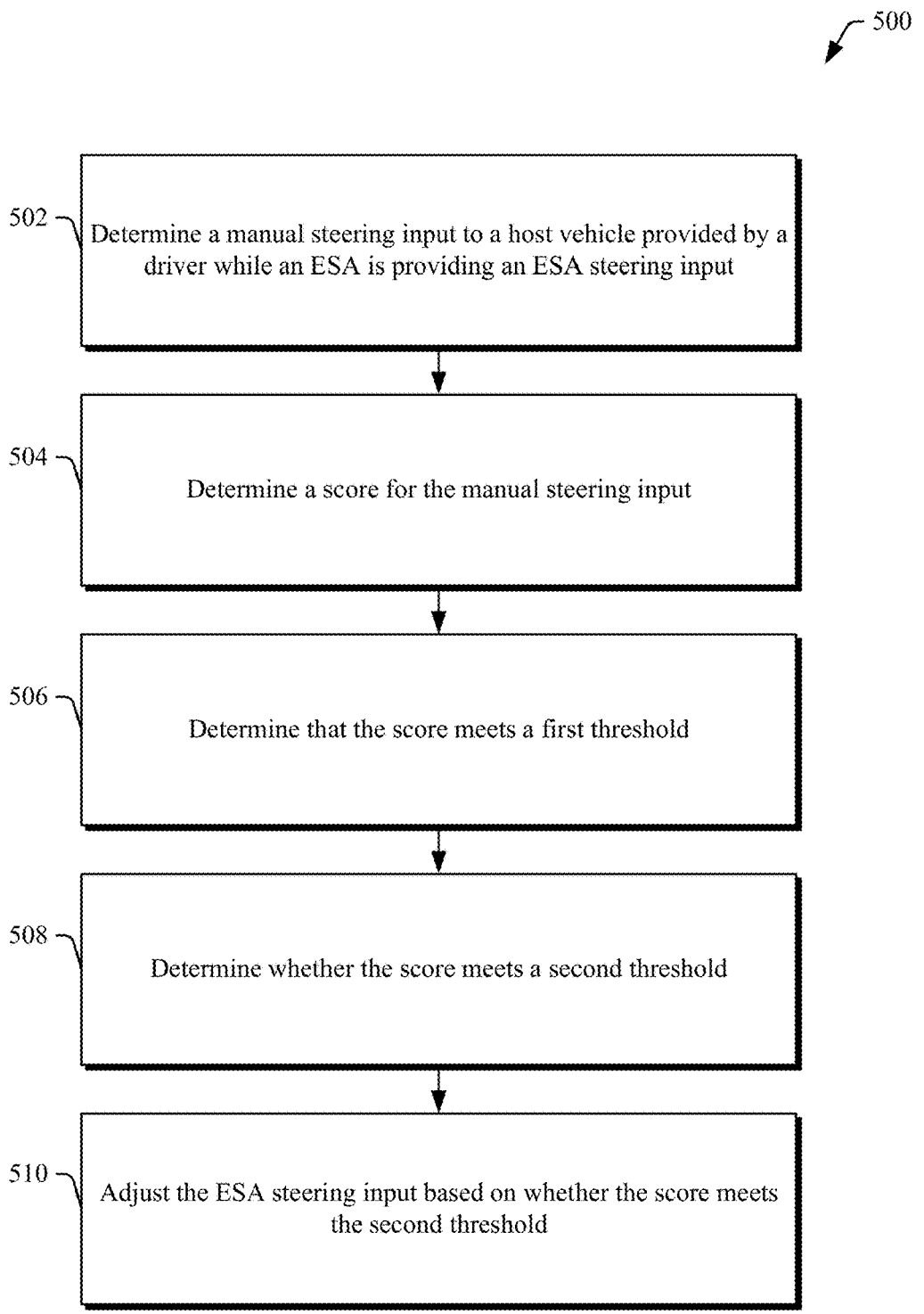
FIG. 5 illustrates, in accordance with techniques of this disclosure, an example method of ESA modification based on manual steering inputs.

FIG. 5 is an example method 500 for ESA modification based on manual steering inputs. The example method 500 may be implemented in any of the previously described environments, by any of the previously described systems or components, and by utilizing any of the previously described data flows, process flows, or techniques. For example, the example method 500 can be implemented in the example environment 100, as illustrated by the example illustration 200, by the example system 300, and/or by following the example data flow 400. The example method 500 may also be implemented in other environments, by other systems or components, and utilizing other data flows, process flows, or techniques. Example method 500 may be implemented by one or more entities (e.g., the ESA module 112). The order in which the operations are shown and/or described is not intended to be construed as a limitation, and the order may be rearranged without departing from the scope of this disclosure. Furthermore, any number of the operations can be combined with any other number of the operations to implement the example process flow or an alternate process flow.

At 502, it is determined that a manual steering input is being provided by a driver while an ESA is providing an ESA steering input. For example, the ESA module 112 may determine that the ESA activation 404 is present and/or that the path 106 exists and determine the steering angle 108 and the manual steering torque 110.

At 504, a score is determined for the manual steering input. For example, the score module 406 may determine the score 114 based on the manual steering angle (e.g., the steering angle 108 minus a steering angle expected from the ESA steering input) and the manual steering torque 110 (e.g., instantaneous or time-averaged).

At 506, it is determined that the score meets a first threshold. For example, the ESA steering module 408 may determine that the score 114 meets the first threshold of the thresholds 410.

At 508, it is determined whether the score meets a second threshold. For example, the ESA steering module 408 may determine whether the score 114 meets the second threshold of the thresholds 410.

At 510, the ESA steering input is adjusted based on whether the score meets the second threshold. For example, the ESA module 112 (or the ESA steering module 408) may cause the vehicle component 306 to modify the ESA steering input (e.g., at 118) responsive to the score 114 not meeting the second threshold. The modification may involve the path modification module 412 creating the modified path 214. Alternatively, the ESA module 112 (or the ESA steering module 408) may cause the vehicle component 306 to cancel the ESA steering input (e.g., at 120) responsive to the score 114 meeting the second threshold. The cancellation may involve allowing the driver to have full control of the vehicle with no ESA steering input.

By using the example method 500, ESA can effectively adapt to manual steering inputs provided by drivers during ESA events/activations. In doing so, drivers may acquire more control of a vehicle than conventional techniques while still allowing the ESA to function as designed (e.g., to effectively avoid collisions with targets).

Examples

Example 1: A method comprising: determining that an evasive steering assist (ESA) of a host vehicle is providing an ESA steering input to the host vehicle to avoid a collision with a target; determining a manual steering input to the host vehicle provided by a driver of the host vehicle; determining a score for the manual steering input, the score quantifying an amount of additional steering input provided by the manual steering input relative to the ESA steering input; determining that the score meets a first threshold for modifying the ESA steering input; determining whether the score meets a second threshold for canceling the ESA steering input; and adjusting, based on whether the score meets the second threshold, the ESA steering input to provide a different ESA steering input than the ESA steering input prior to the modifying.

Example 2: The method of example 1, wherein the score is based on an additional steering angle and an additional steering torque corresponding to the manual steering input.

Example 3: The method of example 1 or 2, wherein the additional steering angle comprises a difference between a current steering angle of the host vehicle and a steering angle provided by the ESA steering input.

Example 4: The method of example 1, 2, or 3, wherein the additional steering torque comprises an amount of torque applied to a steering wheel of the host vehicle.

Example 5: The method of any preceding example, wherein the additional steering torque comprises a moving average of torques applied to the steering wheel.

Example 6: The method of any preceding example, wherein the adjusting the ESA steering input comprises canceling the ESA steering input responsive to determining that the score meets the second threshold.

Example 7: The method of any preceding example, further comprising determining a path corresponding to the ESA steering input, wherein the adjusting the ESA steering input comprises modifying the path responsive to determining that the score does not meet the second threshold.

Example 8: The method of any preceding example, wherein the modifying the path is based on a difference between a current steering angle of the host vehicle and a steering angle corresponding to the ESA steering input.

Example 9: The method of any preceding example, wherein the modifying the path comprises: determining a destination point of the path; generating a modified destination point based on the difference between the current steering angle of the host vehicle and the steering angle corresponding to the ESA steering input; generating a polynomial representing a modified path from a current location of the host vehicle to the modified destination point; and adapting the path to the polynomial.

Example 10: A system comprising at least one processor configured to: determine that an evasive steering assist (ESA) of a host vehicle is providing an ESA steering input to the host vehicle to avoid a collision with a target; determine a manual steering input to the host vehicle provided by a driver of the host vehicle; determine a score for the manual steering input, the score quantifying an amount of additional steering input provided by the manual steering input relative to the ESA steering input; determine whether the score meets a first threshold for adjusting the ESA steering input; and responsive to determining that the score does not meet the first threshold, refrain from adjusting the ESA steering input; or responsive to determining that the score does meet the first threshold: determine whether the score meets a second threshold for canceling the ESA steering input; and responsive to determining that the score does not meet the second threshold, modify the ESA steering input to provide a different ESA steering input than the ESA steering input prior to the modification; or responsive to determining that the score does meet the second threshold, cancel the ESA steering input.

Example 11: The system of example 10, wherein the score is based on an additional steering angle and an additional steering torque corresponding to the manual steering input.

Example 12: The system of example 10 or 11, wherein the score is further based on a weighted average of the additional steering angle and the additional steering torque.

Example 13: The system of example 10, 11, or 12, wherein the additional steering angle comprises a difference between a current steering angle of the host vehicle and a steering angle corresponding to the ESA steering input.

Example 14: The system of any of examples 10-13, wherein the additional steering torque comprises an amount of torque applied to a steering wheel of the host vehicle.

Example 15: The system of any of examples 11-14, wherein the additional steering torque comprises a moving average of torques applied to the steering wheel.

Example 16: The system of any of examples 11-15, wherein the processor is further configured to, responsive to determining that the score does not meet the second threshold, determine a path corresponding to the ESA steering input, wherein the modification of the ESA steering input comprises modifying the path.

Example 17: The system of any of examples 11-16, wherein the modification of the path is based on a difference between a current steering angle of the host vehicle and a steering angle corresponding to the ESA steering input.

Example 18: The system of any of examples 11-17, wherein the modification of the path comprises: determining a destination point of the path; and generating a modified destination point based on the difference between the current steering angle of the host vehicle and the steering angle corresponding to the ESA steering input.

Example 19: The system of any of examples 11-18, wherein the modification of the path further comprises: generating a polynomial representing a modified path from a current location of the host vehicle to the modified destination point; and adapting the path to the polynomial.

Example 20: Computer-readable storage media comprising instructions that, when executed by at least one processor, cause the processor to: determine that an evasive steering assist (ESA) of a host vehicle is providing an ESA steering input to the host vehicle to avoid a collision with a target; determine a manual steering input to the host vehicle provided by a driver of the host vehicle; determining a score for the manual steering input, the score quantifying an amount of additional steering input provided by the manual steering input relative to the ESA steering input; determine whether the score meets a first threshold for adjusting the ESA steering input; and responsive to determining that the score does not meet the first threshold, refrain from adjusting the ESA steering input; or responsive to determining that the score does meet the first threshold: determine whether the score meets a second threshold for canceling the ESA steering input; and responsive to determining that the score does not meet the second threshold, modify the ESA steering input to provide a different ESA steering input than the ESA steering input prior to the modification; or responsive to determining that the score does meet the second threshold, cancel the ESA steering input.

Example 21: A system comprising: a processor configured to perform the method of any of examples 1-9.

Example 22: Computer-readable storage media comprising instructions that, when executed by at least one processor, cause the processor or an associated system to perform the method of any of examples 1-9.

Example 23: A system comprising means for performing the method of any of examples 1-9.

Example 24: A method performed by the system of any of examples 10-19.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method comprising:
   determining that an evasive steering assist (ESA) of a host vehicle is providing an ESA steering input to the host vehicle to avoid a collision with a target;
   determining a manual steering input to the host vehicle provided by a driver of the host vehicle;
   determining an expected steering angle provided by the ESA steering input to the host vehicle;
   determining a manual steering torque applied by the driver to a steering column of the host vehicle;
   determining an additional steering angle provided by the driver relative to the ESA steering input based on a difference between the manual steering input and the expected steering angle;
   calculating a score using a Sigmoid function based on the additional steering angle and the manual steering torque, the score quantifying an amount of additional steering input provided by the manual steering input relative to the ESA steering input and being calculated based on a sum of (i) a product of a weighting constant and the Sigmoid function of the additional steering angle, and (ii) a product of one minus the weighting constant and the Sigmoid function of the manual steering torque;
   determining whether the score meets a first threshold for modifying the ESA steering input;
   determining whether the score meets a second threshold that is higher than the first threshold for canceling the ESA steering input;
   responsive to the score not meeting the first threshold, maintaining the ESA steering input;
   responsive to the score meeting the first threshold but not meeting the second threshold, adjusting, based on the additional steering angle, the ESA steering input to provide a different ESA steering input than the ESA steering input prior to adjustment; and
   responsive to the score meeting the second threshold, canceling the ESA steering input and allowing the driver to manually steer the host vehicle.

2. The method of claim 1, wherein the manual steering torque is calculated as a moving average of torques applied by the driver to the steering column of the host vehicle.

3. The method of claim 1, further comprising:
   determining a path corresponding to the ESA steering input, wherein the adjusting the ESA steering input comprises modifying the path.

4. The method of claim 3, wherein the modifying the path is based on the difference between the manual steering input and the expected steering angle.

5. The method of claim 4, wherein the modifying the path comprises:
   determining a destination point of the path;
   generating a modified destination point based on the difference between the manual steering input and the expected steering angle;
   generating a polynomial representing a modified path from a current location of the host vehicle to the modified destination point; and
   adapting the path to the polynomial.

6. A system comprising at least one processor configured to:
   determine that an evasive steering assist (ESA) of a host vehicle is providing an ESA steering input to the host vehicle to avoid a collision with a target;
   determine a manual steering input to the host vehicle provided by a driver of the host vehicle;
   determine an expected steering angle provided by the ESA steering input to the host vehicle;
   determine a manual steering torque applied by the driver to a steering column of the host vehicle;
   determine an additional steering angle provided by the driver relative to the ESA steering input based on a difference between the manual steering input and the expected steering angle;
   calculate a score using a Sigmoid function based on the additional steering angle and the manual steering torque, the score quantifying an amount of additional steering input provided by the manual steering input relative to the ESA steering input and being calculated based on a sum of (i) a product of a weighting constant and the Sigmoid function of the additional steering angle, and (ii) a product of one minus the weighting constant and the Sigmoid function of the manual steering torque;
   determine whether the score meets a first threshold for adjusting the ESA steering input;

determine whether the score meets a second threshold that is higher than the first threshold for canceling the ESA steering input;
responsive to the score not meeting the first threshold, maintain the ESA steering input;
responsive to the score meeting the first threshold but not meeting the second threshold, adjust, based on the additional steering angle, the ESA steering input to provide a different ESA steering input than the ESA steering input prior to adjustment; and
responsive to the score meeting the second threshold, canceling the ESA steering input and allowing the driver to manually steer the host vehicle.

7. The system of claim 6, wherein the manual steering torque is calculated as a moving average of torques applied by the driver to the steering column of the host vehicle.

8. The system of claim 6, wherein the at least one processor is further configured to, determine a path corresponding to the ESA steering input, wherein adjusting the ESA steering input comprises modifying the path.

9. The system of claim 8, wherein the at least one processor is further configured to modify the path based on the difference between the manual steering input and the expected steering angle.

10. The system of claim 9, wherein the at least one processor is further configured to modify the path by:
determining a destination point of the path; and
generating a modified destination point based on the difference between the manual steering input and the expected steering angle.

11. The system of claim 10, wherein the at least one processor is further configured to modify the path by:
generating a polynomial representing a modified path from a current location of the host vehicle to the modified destination point; and
adapting the path to the polynomial.

12. A non-transitory computer-readable storage media comprising instructions that, when executed by at least one processor, cause the processor to:
determine that an evasive steering assist (ESA) of a host vehicle is providing an ESA steering input to the host vehicle to avoid a collision with a target;
determine a manual steering input to the host vehicle provided by a driver of the host vehicle;
determine an expected steering angle provided by the ESA steering input to the host vehicle;
determine a manual steering torque applied by the driver to a steering column of the host vehicle;
determine an additional steering angle provided by the driver relative to the ESA steering input based on a difference between the manual steering input and the expected steering angle;
calculate a score using a Sigmoid function based on the additional steering angle and the manual steering torque, the score quantifying an amount of additional steering input provided by the manual steering input relative to the ESA steering input and being calculated based on a sum of (i) a product of a weighting constant and the Sigmoid function of the additional steering angle, and (ii) a product of one minus the weighting constant and the Sigmoid function of the manual steering torque;
determine whether the score meets a first threshold for adjusting the ESA steering input;
determine whether the score meets a second threshold that is higher than the first threshold for canceling the ESA steering input;
responsive to the score not meeting the first threshold, maintain the ESA steering input;
responsive to the score meeting the first threshold but not meeting the second threshold, adjust, based on the additional steering angle, the ESA steering input to provide a different ESA steering input than the ESA steering input prior to adjustment; and
responsive to the score meeting the second threshold, canceling the ESA steering input and allowing the driver to manually steer the host vehicle.

\* \* \* \* \*